UNITED STATES PATENT OFFICE.

E. E. MARCY, OF NEW YORK, N. Y.

IMPROVEMENT IN CURING AND TREATING CAOUTCHOUC.

Specification forming part of Letters Patent No. 25,273, dated August 30, 1859.

*To all whom it may concern:*

Be it known that I, E. E. MARCY, of the city of New York, in the county and State of New York, have invented a new and Improved Method of Treating and Curing India-Rubber, which will cause it to retain permanent elasticity and withstand changes of temperature and emit no unpleasant odor; and I declare the following is a true description of the same.

The nature of my invention consists in curing india-rubber, when combined with the hyposulphite of zinc, by submitting the compound to the action of steam or water at a high temperature.

I procure the hyposulphite of zinc in the following manner, which is the best mode known to me, although it may be produced by other means. I boil flowers of sulphur in a solution of caustic soda or sal-soda or caustic potash, soda-ash, or lime so long as any sulphur is dissolved, then pour off the clear yellow liquor and add it to a solution of one of the salts of zinc. The result of this is a white precipitate which is the hyposulphite of zinc. I pour off the supernatant liquor from the precipitate. Then dry it and grind it to an impalpable powder. In this form I mix it with india-rubber in the proportion of two parts of india-rubber, by weight, to one part of the hyposulphite of zinc. This proportion may be varied with good results; but it is the best known to me. The india-rubber and the hyposulphite in the form of powder are then combined by being passed between heated rollers or grinders in the usual mode of preparing and manufacturing india-rubber. After the mixture is thoroughly combined it may be spread upon cloth or rolled into sheets or put into any other required form for use. It should then be subjected to the action of steam or water at a high temperatue by being placed in a vessel containing steam at a heat from 240° to 350° Fahrenheit, or containing water or water and steam at the same high temperature.

It may be necessary for the thorough curing of some articles to increase the temperature beyond the degree indicated; but the degree of temperature and the length of time that the compound must be submitted to the heat will depend to a certain extent upon the size and quality of the fabric, but the temperature will in no case be carried so high as to liberate sulphur from the compound above described.

The application of heat by means of steam or water may be made by any of the well-known processes in the manufacture of india-rubber, and must be made by such means as the compound will not cure satisfactorily in dry air at any temperature.

Other substances may be mixed and ground up with this compound for the purpose of increasing its bulk and hardening it, and for giving the fabrics color and other properties well known to india-rubber manufacturers; but such articles have no effect in producing the result I have described. Such ingredients are well known to manufacturers of india-rubber, and may be used in connection with my discovery.

I do not claim the curing of india-rubber as specified in the patent of Tyer and Helm, dated January 30, 1849, and reissued August 7, 1849, and May, 1859, or as described in the patent of I. T. Trotter, December 3, 1850; but What I do claim as my invention, and desire to secure by Letters Patent, is—

The improved process of curing india-rubber and producing an improved article of india-rubber by combining india-rubber with the hyposulphite of zinc, in the manner hereinbefore described, and without the use of free sulphur in combination with the rubber or with said compound, and the exposure of this compound to steam or water at the temperature hereinbefore stated, and in the mode pointed out.

E. E. MARCY.

In presence of—
 JAMES MARRINER,
 FREDERICK C. WAGNER.